United States Patent [19]

Stanford

[11] 3,710,406
[45] Jan. 16, 1973

[54] COMBINATION WIRE STRIPPER AND PLIER DEVICE

[76] Inventor: Joe H. Stanford, 3249 Pearl St., Franklin Park, Ill. 62638

[22] Filed: Nov. 10, 1970

[21] Appl. No.: 88,415

[52] U.S. Cl..................................7/5.1, 30/90.1
[51] Int. Cl. .........................................H02g 1/12
[58] Field of Search..........7/3, 4, 5, 5.1, 5.2, 5.3, 5.4, 7/5.5, 5.6; 81/9.5 R, 9.5 C; 30/90.1, 91.2

[56] References Cited

UNITED STATES PATENTS

| | | | |
|---|---|---|---|
| 1,805,276 | 5/1931 | Chucto | 30/91.2 |
| 1,800,317 | 4/1931 | Ries et al. | 81/9.5 R |
| 3,058,377 | 10/1962 | Hardt | 30/91.2 |
| 3,151,509 | 10/1964 | Gormley | 81/9.5 R |
| 2,940,343 | 6/1960 | Hindenburg | 30/91.2 |
| 1,546,989 | 7/1925 | Morris | 7/3 R |

FOREIGN PATENTS OR APPLICATIONS 1,109,137  9/1955  France ........................7/5.5

Primary Examiner—Robert C. Riordon
Assistant Examiner—Roscoe V. Parker, Jr.
Attorney—Robert L. Slater, Jr. and Jerome Goldberg

[57] ABSTRACT

A combination wire stripper and plier device comprising a pair of handle members having cutting plates mounted at the upper ends thereof. When the handles are in a closed position, the cutting plates mesh together and form a plurality of substantially circular knives, each being suitable for cutting and stripping insulation from a predetermined size of electrical wire.

10 Claims, 6 Drawing Figures

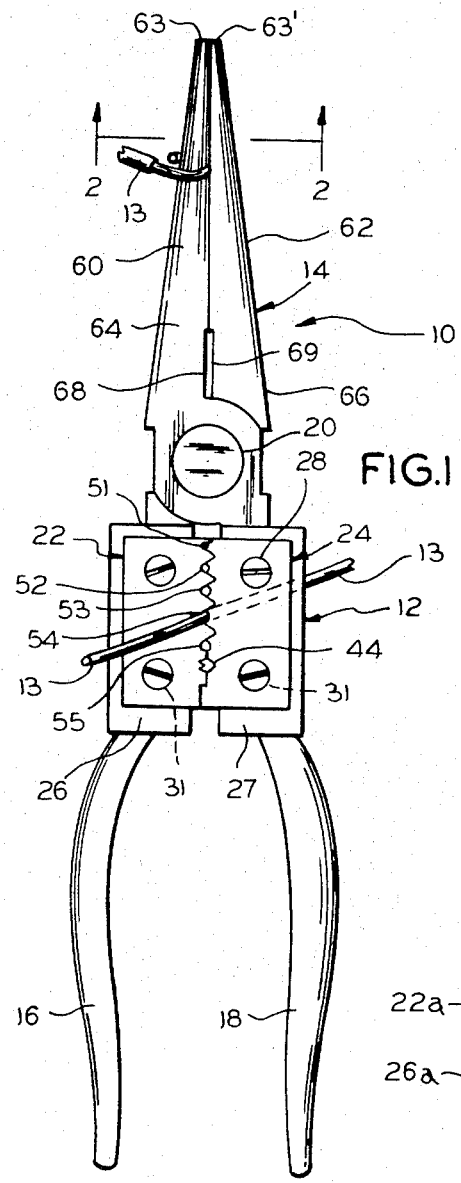
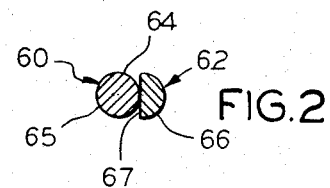
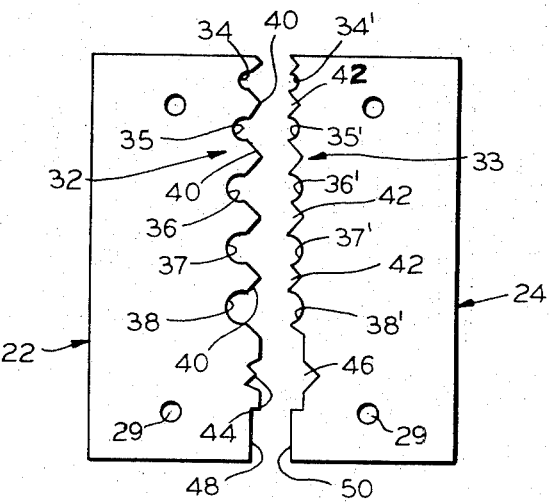
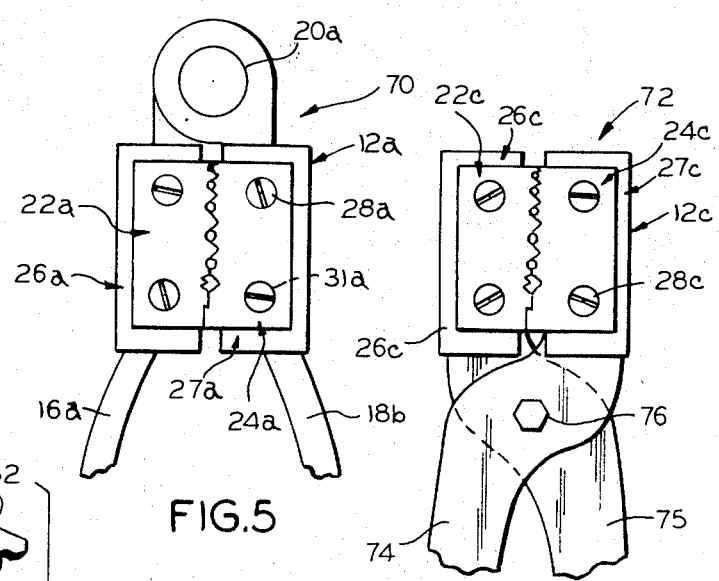
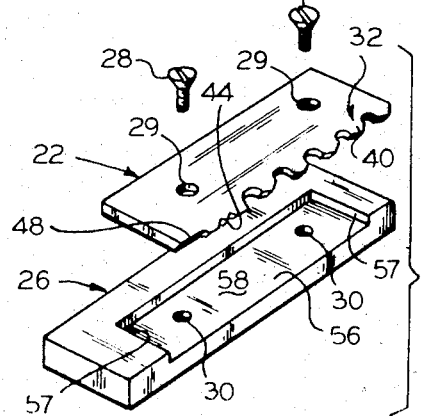

COMBINATION WIRE STRIPPER AND PLIER DEVICE

BACKGROUND OF THE INVENTION

This invention relates generally to a wire stripper device and more particularly relates to a combination wire stripper and plier device.

One type of wire stripper device extensively used included a single opening through which wires of various sizes were inserted and stripped. A manual adjust was used to increase or decrease the size of the opening. An undesirable feature of these prior wire strippers was the difficulty and the time consumed in order to accurately set the size of the opening. Many times due to an improper setting, the wire was cut or marred during stripping and either broke off immediately or made a weak mechanical contact and often even a defective electrical contact with an electrical terminal.

Another type of wire stripper device included a plurality of openings, each dimensioned for a particular electrical wire size. These wire strippers were generally bulky and cumbersome to carry around. In the event the cutting teeth of the wire stripper device were damaged or burned due to contact with a hot electrical line, repair was often difficult or virtually impossible and a new replacement of the entire device was frequently required.

SUMMARY OF THE INVENTION

The subject invention comprises a wire stripper section including a first cutting plate mounted at the upper end of one handle member and a second cutting plate mounted at the upper end of another handle member. The concave teeth of one cutting plate and the concave teeth of the other cutting plate form substantially circular knives when the handle members are in a closed or wire stripping position. In the closed position, the peaks of one cutting plate are received or meshed in the valleys of the other cutting plate.

The cutting plates are supported on support plates. The support plate may include a depression defined by sidewalls and a bottom to receive and support the cutting plate. The support plates prevent the cutting plates from slipping or moving, and thereby ensure proper meshing of the cutting plates prior to each stripping operation. If one or both of the cutting plates becomes damaged or dull, they could easily be removed for repair or replacement.

A plier section is provided which is also controlled by the handle members. The plier section includes a pair of elongated jaws, one jaw having a circular cross-sectional area progressively increasing in area from the outer tip to the bottom thereof. The circular jaw enables the outer ends of stripped wire to be formed into curves or rings, prior to being wrapped and secured on to an electrical terminal. The other jaw includes a planar inner surface suitable for bending and forcing the ring of wire tightly around the circular elongated jaw.

It is therefore a primary object of the invention to provide a combination electrical wire stripper and plier device.

Another object is to provide a wire stripper device having a plurality of substantially circular cutting knives, each being dimensioned to strip the insulation from a specific wire size.

Another object is to provide a wire stripper device comprising one cutting plate having a plurality of peaks and a second cutting plate having a plurality of valleys to receive and mesh with the peaks when the device is in the closed or wire stripping position.

Another object is to provide a cutting plate removably secured to the device, to enable easy repair or replacement of the cutting plate.

Another object is to provide a support plate having a depression for receiving the cutting plate to prevent movement of the cutting plate.

Still another object is to provide a plier device comprising a first elongated jaw having a substantially circular cross-sectional area increasing in magnitude from the outer tip to the lower end thereof, and a second elongated jaw having a substantially semi-circular cross-sectional area increasing in magnitude from the outer tip to the lower end thereof with the inner surface of the second jaw being a substantially planar surface.

BRIEF DESCRIPTION OF THE DRAWINGS

Referring to the drawings in which the same characters of reference are employed to indicate corresponding or similar parts throughout the several figures of the drawings:

FIG. 1 illustrates a combination wire stripper and plier device embodying the principles of the invention;

FIG. 2 is a cross-sectional view taken on the plane of the line 2 — 2 in FIG. 1, showing the plier section of the device having one jaw with a circular cross-sectional area and a second jaw with a semi-circular cross-sectional area;

FIG. 3 is an enlarged front view of the cutting plates spaced apart;

FIG. 4 is a perspective view illustrating the cutting plate spaced above from the support plate;

FIG. 5 illustrates a wire stripper device which is another embodiment of the invention; and FIG. 6 is another embodiment of a wire stripper device of the invention.

DESCRIPTION OF THE PREFERRED EMBODIMENT

Referring now particularly to FIG. 1 of the drawing, the reference numeral 10 indicates generally a combination wire stripper and plier device. The device 10 comprises a wire stripper section 12 for stripping insulation from a length of electrical wire 13 and a plier section 14. A pair of handles 16,18 pivot at a pivot pin 20 to provide an open and closed position.

The wire stripper section 12 includes cutting plates 22 and 24 supported respectively on support plates 26,27. Cutting plate 22 and support plate 26 are secured to the upper end of handle 16, and cutting plate 24 and support plate 27 are secured to the upper end of handle 18. The cutting and support plates may be fastened by screws 28 passing through apertures 29,30 in the cutting and support plates and screwed into threaded holes 31 formed in the handles 16, 18.

As may be seen in FIG. 3, the cutting plates 22,24 comprise respectively cutting edges 32,33. Cutting edge 32 includes a plurality of concave teeth 34, 35, 36, 37 and 38 spaced apart by triangular peaks 40. Cutting edge 33 includes substantially identical teeth 34', 35', 36', 37' and 38' but spaced apart by triangular valleys 42. The size of the teeth increase progressively from the top to the bottom of the corresponding cutting edges 32, 33.

Cutting plate 22 also includes a crimper 44 protruding out from cutting edge 32 to substantially align with the outermost edge of teeth 34, 35, 36, 37 and 38. Crimper 44 is received in opening 46 formed in the cutting edge 32. The cutting plate 22 also includes a cutter 48 positioned inward with respect to the outer point of the teeth 34, 35, 36, 37 and 38. Cutting plate 24 includes a cutter 50 opposed to cutter 48 and in substantial alignment with the outer points of teeth 34', 35', 36', 37' and 38'.

In the open position of handles 16,18 the cutting edges 32,33 are spaced apart. In the closed position of the handles, the peaks 40 are received in the valleys 42, so that teeth 34 and 34', teeth 35 and 35', teeth 36 and 36', teeth 37 and 37' and teeth 38 and 38' each form a different size circular knife identified respectively by reference numerals 51, 52, 53, 54 and 55. Each circular knife is dimensioned to cut and strip the insulation from a particular diameter size of electrical wire 13.

The support plates 26,27, include rectangular depressions 56 for receiving the cutting plates 22,24 (FIG. 4). The side walls 57 and bottom 58 of the depression 56 confine the cutting plate 22 in the desired location and prevent the plate from slipping, so that the cutting edges 32,33 properly mesh prior to a wire stripping operation. In the event the cutting edge of one or both of the plates becomes dull or damaged, the cutting plate could be easily removed from the support plate and replaced or possibly repaired.

The plier section 14 comprises a pair of gripper jaws 60,62, protruding out from pivot pin 20. The cross-sectional areas of jaws 60,62 decrease progressively in magnitude from pivot pin 20 until the respective outer tips 63,63'. As may be seen in FIG. 2, the cross-sectional area of jaw 60 is circular, having curved outer and inner surfaces 54,55. The cross-sectional area of jaw 62 is semi-circular in shape having an arcuate or curved outer surface 66 and a planar inner surface 67.

Circular jaw 60 enables the outer ends of the wire 13 after being stripped to be formed into circular rings for connection particularly on to screw type electrical terminals.

Cutters 68,69 may be formed respectively at the inner edges at the lower portions of jaws 60,62.

In FIG. 5, a wire stripper device indicated generally by the reference numeral 70 is illustrated. Similar parts to the parts of the device 10 are designated by the same numeral and a suffix a. As shown, the device 70 is identical to the device 10 except it does not include the plier section 14.

In FIG. 6, a wire stripper device indicated generally by the reference numeral 72 is illustrated. Similar parts to the parts of device 10 are indicated by the same numeral and a suffix c. The handle members 74,75 cross in an area below the wire stripper section 12c of the device 72. A pivot pin 76 is located in the crossing area. Plate 22c is associated with handle member 75 and plate 24c is associated with handle member 74.

The description of the preferred embodiments of this invention are intended merely as illustrative of this invention, the scope and limits of which are set forth in the following claims.

I claim:

1. In a combination plier and wire stripper device including a plier section, a wire stripper section, a pair of handle members associated with said sections, said handle members having a closed position and an open position, and said wire stripper section comprising:
    a first cutting plate associated with one handle member and a second cutting plate associated with the other handle member, each of said cutting plates including a plurality of concave teeth,
    a peak positioned adjacent one of the concave teeth;
    a valley positioned adjacent one of the concave teeth of the other of the cutting plates, said peak being received in said valley when the handle members are in the closed position for aligning the concave teeth of one plate with the concave teeth of the other plate and thereby forming a plurality of substantially circular cutting knives.

2. The device of claim 1 includes:
    securing means for removably securing the cutting plate with the corresponding handle member.

3. The device of claim 1 includes:
    a support plate positioned between each cutting plate and a corresponding handle member, securing means for removably securing the cutting plate and corresponding support plate and handle member together.

4. The device of claim 3 wherein said support plate includes a depression to receive said cutting plate.

5. The device of claim 4 wherein said depression is defined by sidewalls and a bottom, said cutting plates and said support plates each including at least one aperture and with said handle member each including at least one threaded hole; said securing means comprising a screw member for passing through said aperture of the cutting plate and corresponding support plate to threadly associate in said threaded hole.

6. The device of claim 4 includes:
    a plier section comprising a ; first elongated jaw and a second elongated jaw; and
    a pivot means disposed between the plier section and wire stripper section, said first jaw being connected to one of said handle members and said second jaw being connected to the other handle member, said first jaw and said one handle member pivoting around said pivot means in one direction and said second jaw and the other handle member pivoting around said pivot means in the opposite direction when manually moving the handle member from the closed position to an open position.

7. The device of claim 6 wherein one of said jaws comprises a substantially circular cross-sectional area increasing progressively in size from the outer tip to the lower end of said one jaw, the other of said jaws having a substantially semi-circular cross-sectional area increasing progressively in size from the outer tip to the lower portion of said other jaw, the inner surface of said other jaw being substantially planar.

8. A wire stripper device including a wire stripper section and a pair of handle members associated with said sections, said handle members having a closed position and an open position, said wire stripper section comprising:
    a first cutting plate associated with one handle member and a second cutting plate associated with the other handle member, each of said cutting plates including a plurality of concave teeth, said concave teeth forming a plurality of substantially circular cutting knives when the handle members are in said closed position;

a peak positioned adjacent one of the concave teeth;

a valley positioned adjacent one of the concave teeth of the other of the cutting plates, when the handle members are closed, said peak, valley and cutting knives lying on substantially the same plane when the handle members are closed.

9. The device of claim 8 includes:

a support plate positioned between each cutting plate and a corresponding handle member, securing means for removably securing the cutting plate and corresponding support plate and handle member together.

10. The device of claim 9 wherein said support plate includes a depression to receive said cutting plate, said depression being defined by sidewalls and a bottom, said cutting plates and said support plates each including at least one aperture and with said handle members each including at least one threaded hole; and securing means comprising a screw member for passing through said apertures of the cutting plate and corresponding support plate to threadly associate in said threaded hole and thereby removably securing the cutting and support plates to the corresponding handle.

* * * * *